Figure 1:
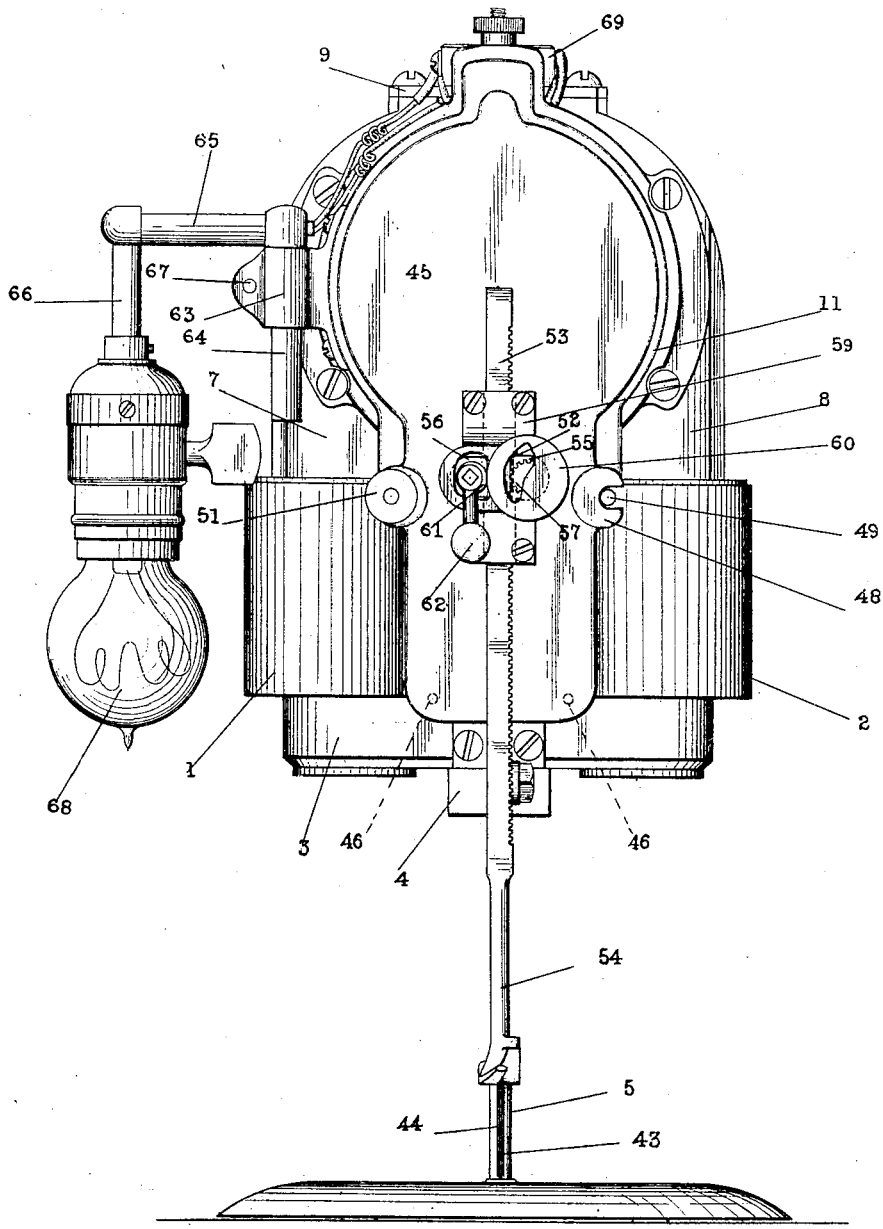

J. R. WARREN & T. BARNARD.
CLOTH CUTTING MACHINE.
APPLICATION FILED JUNE 13, 1908.

967,472.

Patented Aug. 16, 1910.

6 SHEETS—SHEET 1.

J. R. WARREN & T. BARNARD.
CLOTH CUTTING MACHINE.
APPLICATION FILED JUNE 13, 1908.

967,472.

Patented Aug. 16, 1910.
6 SHEETS—SHEET 4.

Witnesses.

Inventors.

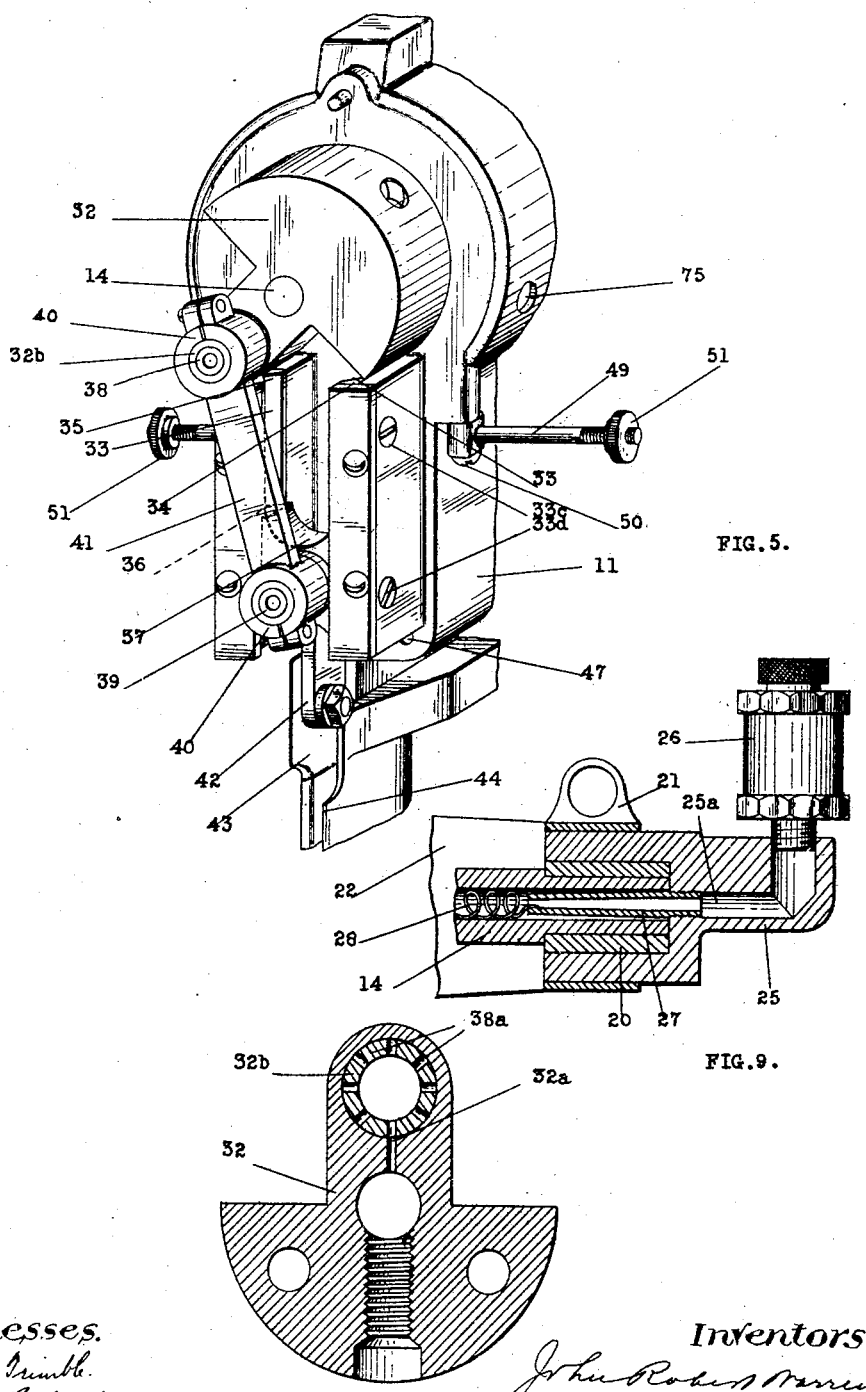

J. R. WARREN & T. BARNARD.
CLOTH CUTTING MACHINE.
APPLICATION FILED JUNE 13, 1908.

967,472.

Patented Aug. 16, 1910.

6 SHEETS—SHEET 6.

Witnesses.

Inventors.

UNITED STATES PATENT OFFICE.

JOHN ROBERT WARREN AND THOMAS BARNARD, OF TORONTO, ONTARIO, CANADA, ASSIGNORS TO EASTMAN MACHINE COMPANY LIMITED, OF TORONTO, CANADA, A CORPORATION.

CLOTH-CUTTING MACHINE.

967,472.   Specification of Letters Patent.   Patented Aug. 16, 1910.

Application filed June 13, 1908. Serial No. 438,296.

*To all whom it may concern:*

Be it known that we, JOHN ROBERT WARREN and THOMAS BARNARD, of the city of Toronto, in the county of York and Province of Ontario, Canada, have invented certain new and useful Improvements in Cloth-Cutting Machines; and we do hereby declare that the following is a full, clear, and exact description of the same.

It has been ascertained in the field of actual experience that an electric motor of the bipolar type is better adapted for the purpose of cloth cutting machines than one of the multipolar type, owing to the fact that the former does not require as many armature sections as the latter to prevent sparking troubles, and by reason of the fact that the high magnetic density to which the armature is subject causes the armature core to heat as a result of the hysteresis caused by the magnetic reversals, the number of magnetic reversals being in proportion to the velocity at which the armature is revolving multiplied by the number of poles employed, the hysteresis of an electric motor of the bipolar type being approximately only one half of that of an electric motor of the multipolar type under the same conditions of magnetic density, velocity, etc.

One of the features of this invention is to design a bipolar electric motor which will be suitable both as regards conformation and utility for the purposes of a cloth cutting machine, and this feature of the invention is carried out by employing two magnet coils arranged side by side below the armature and coupled together by a yoke located beneath the magnet coil casings and by a pole piece located above the magnet coil casings, the pole piece being formed with an annular armature chamber so that the former will embrace the armature and form a portion of the casing therefor, and to utilize the pole piece as one of the supports for the main frame which is provided with a stationary bearing for the armature shaft and with slideways for the cross head of the knife bar.

It has also been ascertained in the field of actual experience that the torsional resistance offered by the cloth to the knife is sufficient under certain conditions of construction to twist the knife bar and render the operation of the machine abortive. To obviate this difficulty the knife bar crank is mounted on the armature shaft on the outer side of the main frame so as to revolve close to the armature shaft bearing and the knife bar cross head is arranged to reciprocate in laterally adjustable slideways alined with the knife bar crank so that the knife bar and knife will operate in a path vertically below the vertical axial line of the knife bar crank, the knife bar crank and the knife bar cross head being provided with wrist pins connected by a pitman which contacts the surface of the knife bar cross head and crank.

It has also been ascertained in the field of actual experience that the motion of the knife bar crank and the knife bar cross head scatters the lubricant, and frequently causes the latter to soil the material being cut. To prevent the scattering of the lubricant the present machine is provided with a removable casing which incloses the operable mechanism, the casing being connected to the main frame by hinge bolts and clamping lugs assisted by dowel pins and dowel sockets so arranged that the casing can be connected to or removed from the main frame without interfering with the operation of, or necessitating any interference with, the operable parts.

It has also been ascertained in the field of actual experience that the vibration of the machine loosens the presser foot locking means and permits the presser foot to relieve its pressure on the material, and another feature of the invention is to provide the presser foot with an effective and easily operated locking device which will readily permit of the accurate adjustment of the presser foot and securely hold it in its adjusted position, and this feature may be said to consist of a locking cam arranged to engage, by gravity, the presser foot rack and clamp it in its guide ways.

It has also been ascertained in the field of actual experience that the armature, the bearing for the armature shaft, and the operating means for the knife bar, become heated to a greater or less degree during their operation. To obviate the heating of these parts the armature is provided with air ducts leading from the outer surface of the armature through the core to the interior of the main frame and the armature shaft or the armature spider is provided within the main frame with a revoluble suction fan to create a suction of air through the air ducts and the armature core into the main frame for the purpose of cooling the armature and the armature shaft during their revolution. To cool the crank pin and the other means which operate the knife bar, the main frame is perforated around the armature bearing so that the air can pass from within the main frame and through the hollow crank pin to the interior of the perforated removable casing and then escape through the perforations in the latter, the main frame being provided with an aperture alined with the suction fan through which an air current can be drawn as the armature and the armature shaft revolve to augment the quantity of air sucked in through the air ducts of the armature.

The invention further relates to the construction of the bearings for the armature shaft each of which is so formed that it will readily receive a removable bushing and correctly center it. This feature of the invention consists in splitting each bearing and providing the members thereof with clamping lugs formed with screw threaded bores to receive the clamping screw by which the members are drawn together to lock the bushing in position, the clamping screw and screw threaded bores of the clamping lugs being preferably arranged so as to be alined with the air ducts of the main frame to permit of a tool being inserted within the main frame to tighten or loosen the clamping pressure of the bearing members on the bushing.

The invention further relates to the means by which the lubricant is distributed to the bearings for the armature shaft, the crank pin, and the slideway for the knife bar cross head, and this feature of the invention consists of employing a hollow armature shaft mounted at one end in the bearing in the main frame and at the other end in the removable bearing connected to the pole piece and in providing the last named bearing with a lubricant cup having a feed way for the lubricant to pass into the bore of the hollow armature shaft and be carried through the latter by a spiral conveyer to the parts above named.

For an understanding of the invention reference is to be had to the following description and to the accompanying drawings in which—

Figure 2:
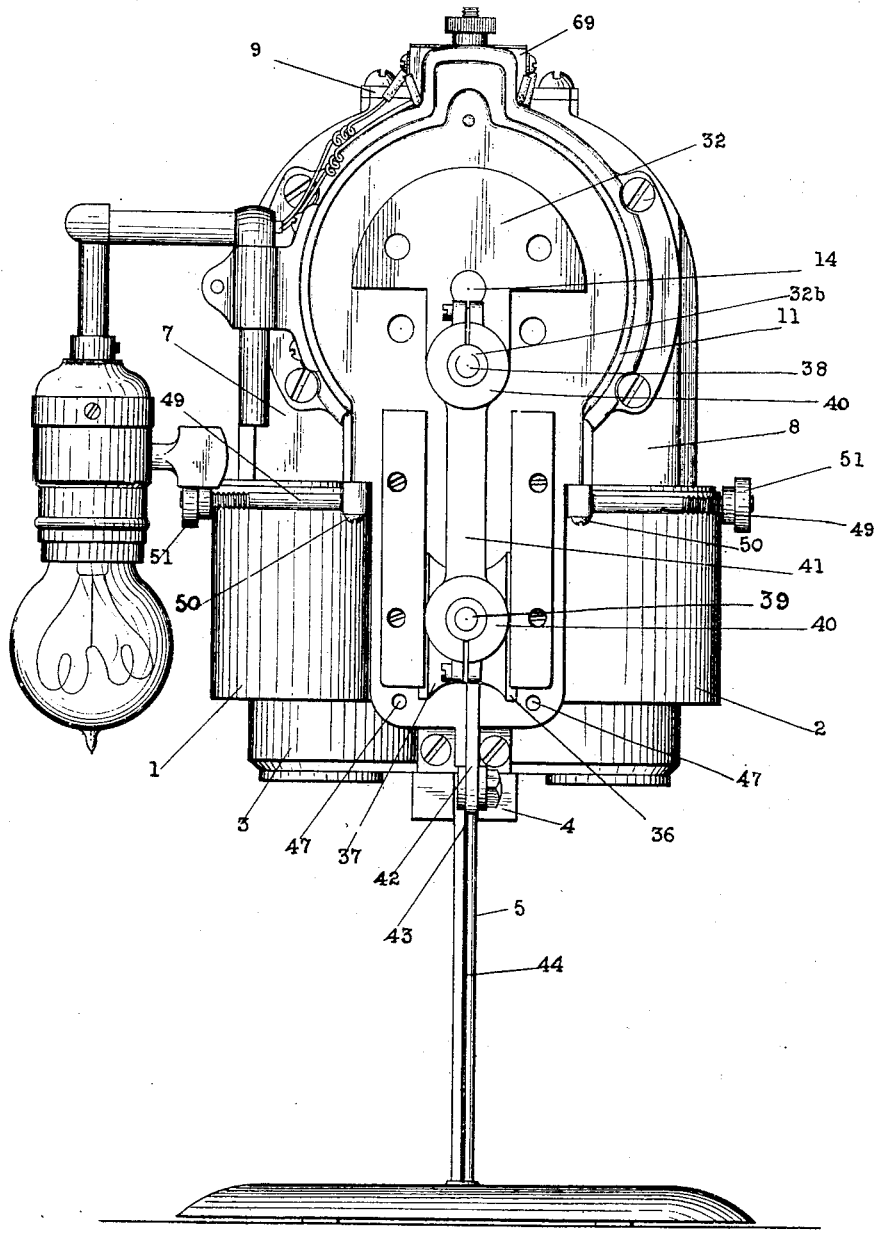
Figure 3:
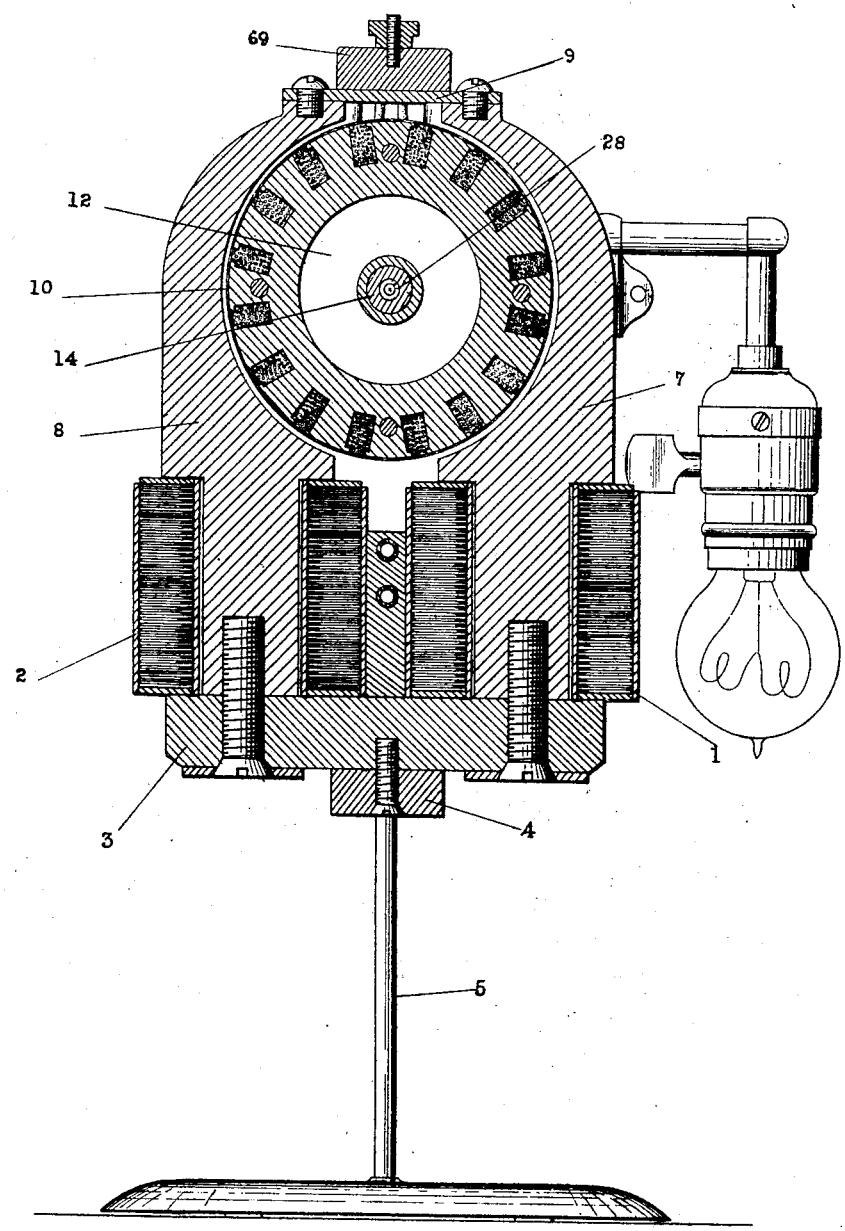
Figure 4:
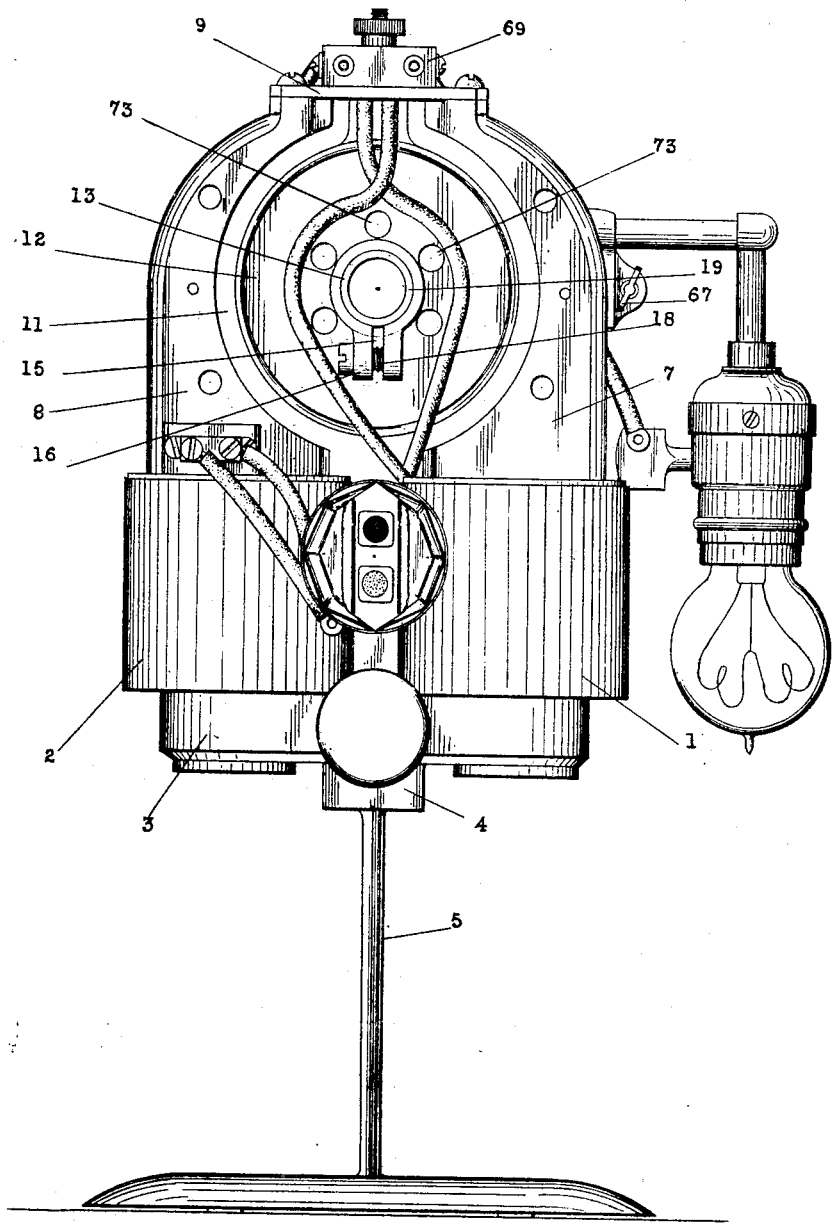
Figures 6, 7:
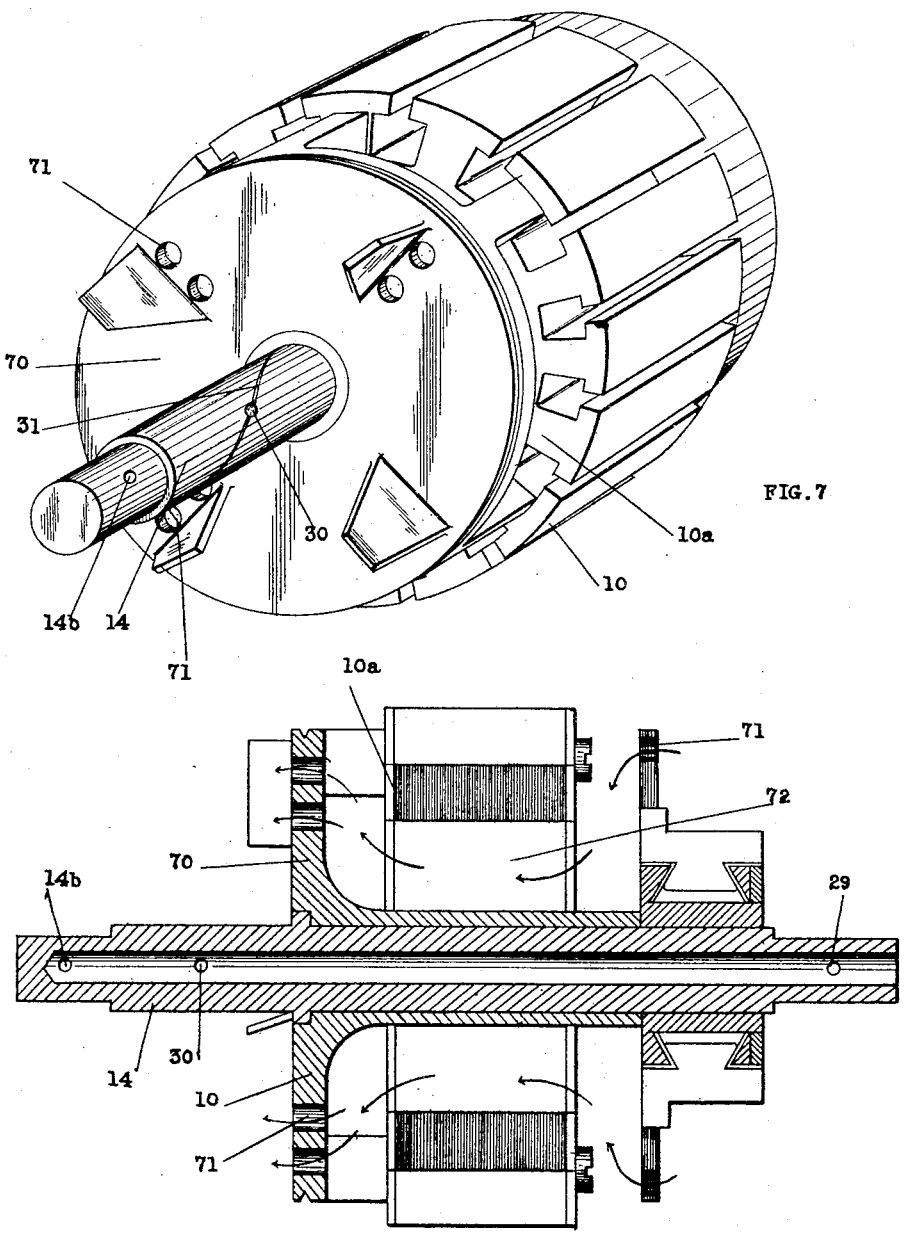

Figure 1, is a front elevation of the cloth cutting machine showing the external arrangement of the parts. Fig. 2, is a similar view to Fig. 1, with the casing for the knife bar, the knife bar cross head, and the crank, removed. Fig. 3, is a transverse vertical section. Fig. 4, is a rear elevation with the armature and the removable bearing omitted. Fig. 5, is a perspective view showing a part of the front of the main frame of the cloth cutting machine, knife bar cross head, slideway, knife bar crank, pitman, and the hinge bolts for connecting the removable casing to the main frame. Fig. 6, is a longitudinal section of the armature showing the air ducts, the hollow armature shaft and the spiral conveyer for the lubricant. Fig. 7, is a perspective view of a portion of the armature and armature fan. Fig. 8, is a section of the balanced crank. Fig. 9, is a sectional view of one of the bearings and oil inlet.

Like characters of reference refer to like parts throughout the specification and drawings.

The magnet coil casings 1 and 2 of the electric motor are placed side by side and coupled together by a yoke 3. The yoke 3 is bolted or otherwise rigidly secured to the horizontal arm 4 of the supporting standard 5 so that the magnet coils will be evenly balanced on both sides of the horizontal arm and be located above the top thereof. Extending from the top of the magnet coil casings 1 and 2 are the pole piece members 7 and 8 which are coupled together at the top by a plate 9 for the support of the connector. The inner faces of the pole piece members 7 and 8 are of a substantially semi-circular shape to form an annular chamber for the armature 10 and partially inclose the armature.

Bolted or otherwise rigidly connected to the front of the pole piece members 7 and 8 is the main frame 11 having an annular chamber 12 for the armature 10. Centrally formed in the main frame 11 is a bearing 13 for the armature shaft 14. The bearing 13 is split lengthwise by a sawcut 15 and connected to the bearing 13 on each side of the sawcut 15 is a lug 16 having a screw threaded hole to receive the clamping screw 18 by which the sides of the sawcut are drawn together to clamp the bearing against the bushing 19 to securely hold the bushing within the bearing. One end of the armature shaft 14 is mounted in the bushing 19 and the other end is mounted in the bushing 20 contained in the split bearing 21 formed in the same manner as the bearing 13. The bearing 21 is detachably connected to the pole piece members 7 and 8 by the bearing arms 22.

The bearing 21 is provided with a hollow extension 25 and connected to the hollow extension 25 is an oil cup 26 through which the oil is fed into the bore $25^a$ of the hollow extension 25. The bore $25^a$ communicates with an axial oil tube 27 extending into the hollow armature shaft 14 and connected to the oil tube 27 and extending into the bore of the hollow armature shaft is a spiral conveyer 28 for the purpose of carrying the oil through the armature shaft 14 so that it can lubricate the bushings 19 and 20 and pass from the bushing 19 to the front face of the main frame 11.

The armature shaft is formed with a lubricant way 29 within the bushing 20, and with a lubricant way 30 within the bushing 19, so that the lubricant can flow from the bore of the armature shaft to the bore of the bushings and distribute the oil evenly therein, the armature shaft being formed with spiral grooves 31 extending axially in both directions from the lubricant ways for that purpose. The armature shaft 14 projects beyond the front of the main frame, and mounted on the projecting end is the balanced crank 32 positioned on the armature shaft to contact the end of the bushing 19 so that the distortion of the armature shaft and balanced crank will be prevented or at least obviated to a material extent. In the projecting end of the armature shaft 14 is a lubricant way $14^b$ through which the oil passes to the lubricant way $32^a$ in the balanced crank. The lubricant way $32^a$ leads to the bushing $32^b$ for the crank pin 38, the bushing being provided with several apertures $38^a$ leading to its bore to lubricate the crank pin 38. Vertically below the balanced crank 32 are slideways 33 provided with removable bushings 34 having V-shaped grooves 35 for the V-shaped guides 36 of the knife bar cross head 37. The path for the knife bar cross head 37 is alined with the vertical axis of the balanced crank 32, and projecting through the balanced crank 32 is a hollow crank pin 38, and projecting through the knife bar cross head 37 is a hollow pin 39. The slideways 33 are provided with adjusting screws $33^c$ and $33^d$ by which the bushings 34 can be laterally adjusted to correctly define the path for the knife bar cross head. Mounted upon the hollow pins 38 and 39 are the hubs 40 of the pitman 41. Extending downwardly from the knife bar cross head 37 is a knife bar 42 and connected to the knife bar 42 is a knife 43 movable in vertical knife guides 44 formed in the front of the supporting standard 5. The knife guides 44 are axially alined with the knife bar cross head 37 and the balanced crank 32, so that these parts will operate in substantially the same vertical plane. Covering the knife bar 42, knife bar cross head 37, slideways 33, balanced crank 32, and pitman 41 is a removable casing 45 having at its lower end dowel pins 46 to enter dowel sockets 47 formed in the main frame 11 below the slideways 33. The sides of the removable casing 45 are formed with slotted lugs 48 to receive the hinge bolts 49 mounted on hinge pins 50 secured to the main frame 11 at the sides of the removable casing 45. The free ends of the hinge bolts 49 are screw threaded to receive the clamping nuts 51. When the removable casing is in the position to cover the operable parts above stated, the dowel pins 46 are contained in the dowel sockets 47 and the hinge bolts 49 are contained in the slots of the lugs 48. When the clamping nuts 51 are tightened against the slotted lugs 48 the removable casing 45 cannot accidentally separate from the main frame. To remove the casing 45 it is necessary only to slacken the clamping nuts 51 and swing the hinge bolts 49 out of engagement with the slotted lugs 48 and withdraw the dowel pins 46 from the dowel sockets 47.

Connected to the front faces of the removable casing 45 are slideways 52 for the rack 53 of the presser foot 54. Formed in the slideways 52 are two substantially annular chambers 55 and 56. Contained in the annular chamber 55 is a pinion 57 the trunnion of which is journaled at one end in a bearing in the removable casing 45 at the inner end of the chamber 55 and journaled at the other end in a plate 59 connected to the front face of the slideways 52 and provided on the outer side of the plate 59 with a thumb wheel 60 by which the pinion is revolved to raise and lower the presser foot 54. Contained in the annular chamber 56 is an eccentric clamp 61 the trunnions of which are journaled in the removable casing 45 at the inner end of the annular chamber 56, and in the plate 59, at the outer end of the annular chamber 56, the last mentioned trunnion projecting through the plate and being provided with a handle by which the eccentric clamp can be positioned to release the rack 53. When it is desired to raise the presser foot 54, the handle 62 is lifted to turn the eccentric clamp 61 and cause it to relieve its pressure on the rack 53. When the handle 62 is released it drops into position and turns the eccentric clamp to engage with the rack 53 so that the rack cannot be raised until the handle 62 has been manually operated to turn the eccentric clamp 61 and relieve the pressure of the latter on the rack.

Extending from the side of the main frame 11 is a lamp socket 63 in which is contained the vertical arm 64 of the lamp bracket. Extending from the top of the vertical arm 64 is a horizontal arm 65 from which depends the lamp suspending arm 66. The socket 63 is provided with a clamping screw 67 by which the vertical arm 64 is held in its adjusted position. By means of the lamp socket 63 and the clamping screw 67 the lamp bracket can be raised and lowered in the lamp socket to vary the elevation of the lamp 68 and the lamp can be turned into any adjusted position within the range of the movement of the horizontal arm, 65, *i. e.* the lamp as shown attached in the present instance, can be turned into position in front of the cloth cutting machine or it can be turned into position against the magnet coil-casings. Attached to the plate 9 is the connector 69 provided with terminals to which the conductors leading to the electric motor and lamp are attached.

As the wiring of the armature and the magnet coils and the arrangement of the switches, and the circuit of the current from the connector through the electromagnet is not essential to the present invention it will not be necessary to describe these features of the apparatus.

Surrounding the armature shaft 14 at the front end of the armature 10 is a fan 70 which may be connected either to the armature shaft or to the armature spider 10$^a$ and formed through the armature from the outer end thereof are air ducts 71 leading to the core 72 so that the air during the revolution of the fan can be sucked through the air ducts and core into the armature chamber of the main frame to cool the armature and bearings 13 for the armature shaft. Formed in the front of the main frame 11 surrounding the bearing 13 are perforations 73 for the passage of the air from the chamber within the main frame to the chamber formed by the removable casing 45, and formed through the removable casing 45 are perforations for the escape of air. Formed through the main frame 11 is an air aperture 75 alined with the clamping screw 18 large enough to permit of the entry of a screw-driver to tighten or loosen the pressure of the clamping screw. By making the crank pin hollow the air can pass from the perforations 73 through the bore of the crank pin as the crank revolves.

Having thus fully described our invention, what we claim as new and desire to secure by Letters Patent is:—

1. A cloth cutting machine comprising, an armature, two laterally disposed magnet coils below the armature, a pole piece member extending upwardly from the top of each magnet coil having its inner face of a substantially semi-circular shape and forming part of the casing of the armature, a coupling piece connecting the pole piece members together above the armature and forming a support for the connector, a yoke connecting the magnet coils together below the armature, a supporting standard rigidly secured to the yoke, a main frame connected to the pole piece members and having an annular chamber for the armature, an armature shaft, a bearing in the main frame for the armature shaft, a reciprocating knife and means actuated by the armature shaft imparting motion to the knife.

2. A cloth cutting machine comprising, an armature, two magnet coils disposed on the opposite sides of the vertical axis of the armature and below the same, pole piece members extending upwardly from the magnet coils and encircling the armature, a coupling plate connecting the pole piece members together above the armature and a yoke connecting the magnet coils together below the armature, a knife, and operable means actuated by the armature for causing the motion of the knife.

3. A cloth cutting machine comprising, an armature, two magnet coils disposed on opposite sides of the vertical axis of the armature and below the same, pole piece members extending upwardly from the magnet coils and encircling the armature, a shaft for the armature, a main frame, having an annular armature chamber and a bearing for the armature shaft, connected to the pole piece members, a reciprocating knife, and operable means actuated by the armature shaft for imparting motion to the knife.

4. A cloth cutting machine comprising two laterally disposed magnet coils, pole piece members for the magnet coils formed with an annular chamber for the armature, a bearing for one of the journals of the armature shaft connected to one side of the pole piece members, a main frame having an annular armature chamber connected to the other side of the pole piece members, a bearing in the main frame for the other journal of the armature shaft, the main frame having a number of perforations surrounding the last mentioned bearing, air ducts formed through the armature, a fan revoluble with the armature for creating a suction through the air ducts, a knife and operable means actuated by the armature for causing the motion of the knife cooled by the air passing through the perforations in the main frame.

5. A cloth cutting machine comprising a main frame, an armature shaft journaled in a bearing in the main frame, a knife bar crank mounted on the armature shaft to revolve close to the armature shaft bearing, a knife bar cross head, laterally adjustable slideways alined with the knife bar crank so that the knife bar cross head will reciprocate in a path vertically below the vertical axial line of the knife bar crank, and a pitman connecting, and contacting the surfaces of, the knife bar cross head and the crank.

6. A cloth cutting machine comprising a main frame, an armature shaft, a knife bar crank revoluble with the armature shaft, laterally adjustable slideways vertically below the vertical axial line of the knife bar crank, laterally adjustable bushings for the slideways, means for adjusting the bushings, a knife bar cross head movable in the slideways, and a pitman connecting the crank and the knife bar cross head.

7. A cloth cutting machine comprising a main frame, an actuating mechanism for the knife bar, a removable casing inclosing the actuating mechanism provided with slotted lugs and hinge bolts by which it is detachably connected to the main frame, and means for locking the removable casing in a closed position.

8. A cloth cutting machine comprising a knife, and a knife operating mechanism, a presser foot having a presser foot rack, guideways for the rack, a pinion meshing with the teeth of the rack, and a gravity actuated eccentric to engage with the rack and lock it in its adjusted position.

9. A cloth cutting machine comprising a knife and a knife operating mechanism, a presser foot having a presser foot rack, guideways for the rack, a pinion meshing with the teeth of the rack, an eccentric to engage with the rack and lock it in its adjusted position, and a gravity means for automatically turning the eccentric into its operable position.

Toronto, May 26th, A. D. 1908.

JOHN ROBERT WARREN.
THOMAS BARNARD.

Signed in the presence of—
C. H. RICHES,
OLIVE BATEMAN.